United States Patent
Okada et al.

(10) Patent No.: US 6,793,059 B2
(45) Date of Patent: Sep. 21, 2004

(54) AUXILIARY MACHINE DRIVE SYSTEM OF AUTOMATIC ENGINE STOP-RESTART SYSTEM EQUIPPED AUTOMOTIVE VEHICLE

(75) Inventors: Hiroshi Okada, Yokohama (JP); Shuji Iwao, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 33 days.

(21) Appl. No.: 10/370,589

(22) Filed: Feb. 24, 2003

(65) Prior Publication Data

US 2003/0173124 A1 Sep. 18, 2003

(30) Foreign Application Priority Data

Mar. 15, 2002 (JP) ........................................ 2002-071225

(51) Int. Cl.[7] .............................................. F02D 29/02
(52) U.S. Cl. ...................... 192/84.1; 192/103 R; 477/5; 477/6; 123/179.4
(58) Field of Search ........................... 192/84.1, 103 R; 477/5, 6, 73; 74/6, 7 R, 7 C; 123/179.4

(56) References Cited

U.S. PATENT DOCUMENTS

| 4,393,964 | A | * | 7/1983 | Kemper | .......................... | 477/6 |
|---|---|---|---|---|---|---|
| 6,048,288 | A | * | 4/2000 | Tsujii et al. | .................... | 477/5 |
| 6,093,974 | A | * | 7/2000 | Tabata et al. | ............. | 290/40 R |
| 6,453,865 | B2 | * | 9/2002 | Hirose et al. | ............ | 123/179.4 |
| 2002/0059019 | A1 | * | 5/2002 | Nakao et al. | ................. | 701/22 |
| 2004/0055305 | A1 | * | 3/2004 | Kuroda et al. | ................ | 60/698 |

FOREIGN PATENT DOCUMENTS

| EP | 0 916 546 A2 | 5/1999 |
|---|---|---|
| EP | 1 132 245 A2 | 9/2001 |
| JP | 2001-193516 A | 7/2001 |

* cited by examiner

*Primary Examiner*—Saul Rodriguez
(74) *Attorney, Agent, or Firm*—Foley & Lardner LLP

(57) ABSTRACT

In an auxiliary machine drive system of an automatic engine stop-restart system equipped automotive vehicle capable of automatically stopping or restarting an engine depending on vehicle operating conditions, an electromagnetic clutch is disposed between the engine and at least one auxiliary machine for connecting and disconnecting an engine crankshaft to and from the auxiliary machine. An electromagnetic clutch control unit deenergizes the electromagnetic clutch at least in an engine running state, and energizes it only when a predetermined energizing condition is satisfied. The predetermined energizing condition includes at least an engine stopped state. The electromagnetic clutch is comprised of a normally-engaged electromagnetic clutch that is engaged when deenergized, and disengaged when energized.

10 Claims, 3 Drawing Sheets

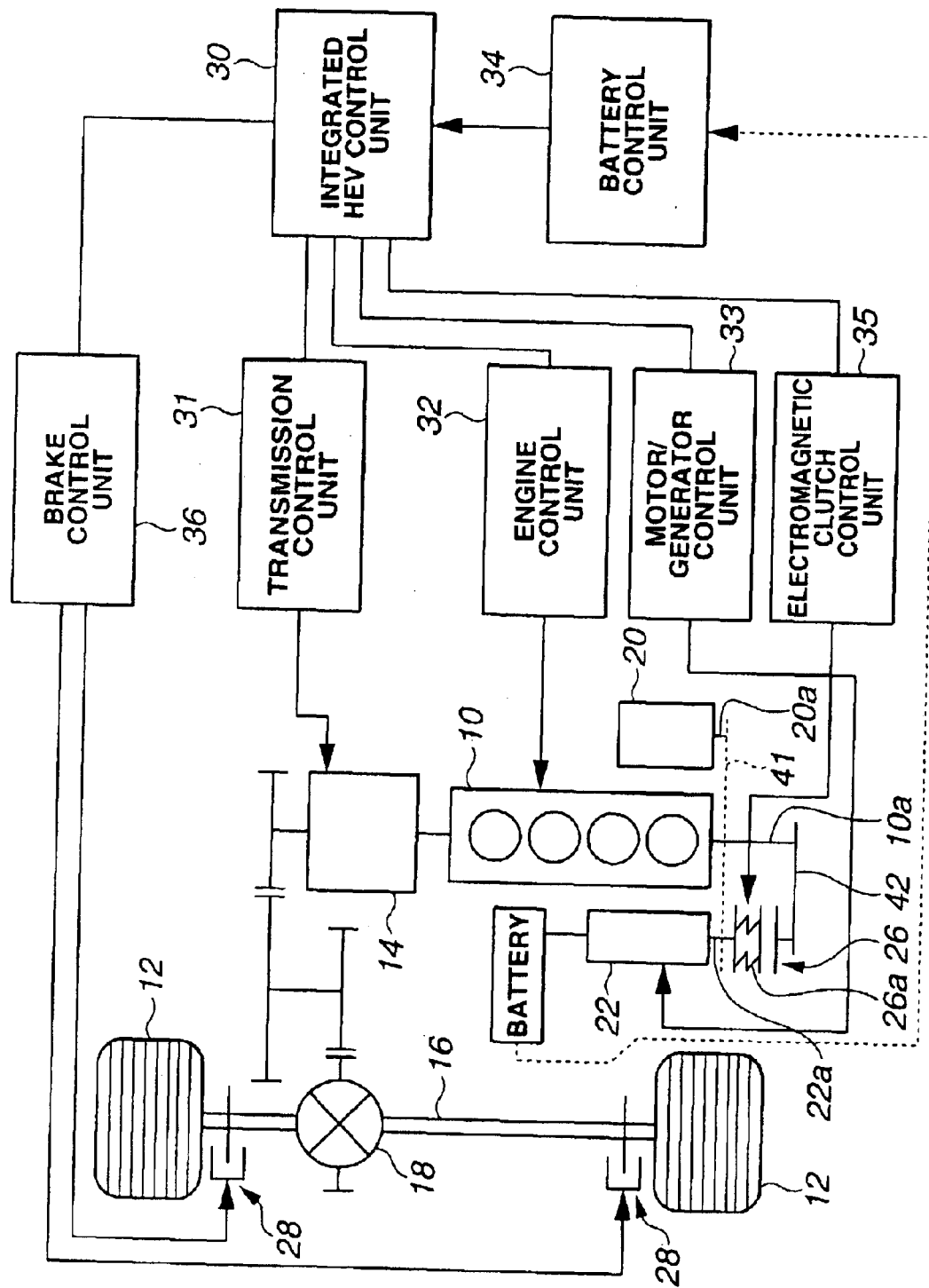

AUXILIARY MACHINE DRIVE SYSTEM OF AUTOMATIC ENGINE STOP-RESTART SYSTEM EQUIPPED AUTOMOTIVE VEHICLE

TECHNICAL FIELD

The present invention relates to an auxiliary machine drive system of an automatic engine stop-restart system equipped automotive vehicle, and specifically to the improvement of an auxiliary machine drive system employing an electromagnetic clutch interposed between an engine and automotive auxiliary machines.

BACKGROUND ART

In recent years, there have been proposed and developed so-called idle-stop vehicles in which an engine is automatically stopped when the vehicle is in its stopped state for exhaust-emission reducing purposes, for example during the temporarily stopped state of the vehicle at a street intersection, and automatically restarted from the vehicle stand-still state. Idle-stop vehicles generally use an auxiliary machine drive system for subsidiarily driving auxiliary machines or car accessories for example a water pump of an engine's cooling system, an air-conditioner compressor, a power-steering pump and the like. One such auxiliary machine drive system of a so-called idle-stop vehicle has been disclosed in Japanese Patent Provisional Publication No. 2001-193516 (herein after is referred to as "JP2001-193516"). In the auxiliary machine drive system disclosed in JP2001-193516, auxiliary machines such as a water pump of an engine's cooling system, an air-conditioner compressor, and a power-steering pump, are connected to each of the engine and an auxiliary-machine drive motor via at least one power-transmission belt. In order to disconnect the engine (exactly, the engine crankshaft) from the auxiliary-machine drive system when driving the auxiliary machines by means of the drive motor and thus to reduce a load on the drive motor, an electromagnetic clutch is interposed between the engine and the auxiliary machines. In case of the system of JP2001-193516, when the engine is running, the electromagnetic clutch is energized for clutch engagement, and as a result the auxiliary machines are driven by means of the engine. Conversely when the engine is stopped, the electromagnetic clutch is de-energized for clutch disengagement, and as a result the auxiliary machines are driven by means of the drive motor in the presence of driving requirement for the auxiliary machines.

SUMMARY OF THE INVENTION

In a so-called idle-stop vehicle as disclosed in JP2001-193516, the engine is automatically temporarily stopped only when a specified condition, such as a zero vehicle speed, a depressed brake pedal, an adequate state of charge of the car battery, an automatic-transmission selector lever kept in a neutral position, and the like, is satisfied. In other words, except for the specified condition, the engine is conditioned in the running state. According to the system disclosed in JP2001-193516, the electromagnetic clutch remains energized during the engine running state. On the contrary, in the automatically-stopped state of the engine, i.e., under the specified condition, the electromagnetic clutch is kept in the deenergized state. As a matter of course, a time interval during which the clutch is energized tends to be remarkably longer than a time interval during which the clutch is deenergized. This results in an increase in electric power consumption, and consequently an increase of overall fuel consumption.

Accordingly, it is an object of the invention to provide an auxiliary machine drive system of an automatic engine stop-restart system equipped automotive vehicle, which is capable of remarkably shortening an energizing time for an electromagnetic clutch interposed between an internal combustion engine and automotive auxiliary machines and of reducing electric power consumption and overall fuel consumption.

In order to accomplish the aforementioned and other objects of the present invention, an auxiliary machine drive system of an automatic engine stop-restart system equipped automotive vehicle capable of automatically stopping or restarting an engine depending on vehicle operating conditions, comprises an electromagnetic clutch disposed between the engine and at least one auxiliary machine for connecting and disconnecting a crankshaft of the engine to and from the auxiliary machine, an electromagnetic clutch control unit deenergizing the electromagnetic clutch at least when the engine is running, and energizing the electromagnetic clutch only when a predetermined energizing condition is satisfied, the predetermined energizing condition including at least a stopped state of the engine, and the electromagnetic clutch comprising a normally-engaged electromagnetic clutch that is engaged when deenergized, and disengaged when energized.

According to another aspect of the invention, an auxiliary machine drive system of an automatic engine stop-restart system equipped automotive vehicle capable of automatically stopping or restarting an engine depending on vehicle operating conditions, comprises a motor generator connected to at least one auxiliary machine to drive the auxiliary machine, the motor generator serving as an engine start-up motor that is connected to a crankshaft of the engine via the electromagnetic clutch when automatically restarting the engine, an electromagnetic clutch disposed between the engine and each of the auxiliary machine and the motor generator for connecting and disconnecting the crankshaft of the engine to and from each of the auxiliary machine and the motor generator, a wrapping connector by which the auxiliary machine and the motor generator are directly connected to each other, an electromagnetic clutch control unit deenergizing the electromagnetic clutch at least when the engine is running, and energizing the electromagnetic clutch only when a predetermined energizing condition is satisfied, the predetermined energizing condition including at least a stopped state of the engine, and the electromagnetic clutch comprising a normally-engaged electromagnetic clutch that is engaged when deenergized, and disengaged when energized.

According to a further aspect of the invention, an auxiliary machine drive system of an automatic engine stop-restart system equipped automotive vehicle capable of automatically stopping or restarting an engine depending on vehicle operating conditions, comprises an electromagnetic clutch disposed between the engine and at least one auxiliary machine for connecting and disconnecting a crankshaft of the engine to and from the auxiliary machine, a control means for deenergizing the electromagnetic clutch at least when the engine is running, and for energizing the electromagnetic clutch only when a predetermined energizing condition is satisfied, the predetermined energizing condition including at least a stopped state of the engine, and the electromagnetic clutch comprising a normally-engaged electromagnetic clutch that is engaged when deenergized, and disengaged when energized.

According to a still further aspect of the invention, a method for executing automatic engine stop-restart control functions for an auxiliary machine drive system of an automatic engine stop-restart system equipped automotive vehicle capable of automatically stopping or restarting an engine depending on vehicle operating conditions and having an electromagnetic clutch disposed between the engine and at least one auxiliary machine for connecting and disconnecting a crankshaft of the engine to and from the auxiliary machine and a motor generator connected to the auxiliary machine to drive the auxiliary machine, the method comprises determining whether a specified automatic stop condition of the engine is satisfied, automatically stopping the engine when the specified automatic stop condition of the engine is satisfied, determining whether a requirement for driving the auxiliary machine by means of the motor generator is present, energizing and disengaging the electromagnetic clutch when the specified automatic stop condition of the engine is satisfied and the requirement for driving the auxiliary machine by means of the motor generator is present, driving the auxiliary machine by means of the motor generator when the electromagnetic clutch is energized and disengaged when the specified automatic stop condition of the engine is satisfied and the requirement for driving the auxiliary machine by means of the motor generator is present, determining whether a specified-automatic restart condition of the engine is satisfied, deenergizing and engaging the electromagnetic clutch when the specified automatic restart condition of the engine is satisfied, and automatically restarting the engine by driving the crankshaft by means of the motor generator and by cranking the engine when the specified automatic restart condition of the engine is satisfied.

The other objects and features of this invention will become understood from the following description with reference to the accompanying drawings.

BRIEF DESCRIPTION OF THE DRAWINGS

FIG. 3 is a system block diagram illustrating an auxiliary machine drive system of an automatic engine stop-restart system equipped automotive vehicle of a second embodiment made according to the invention.

DESCRIPTION OF THE PREFERRED EMBODIMENTS

Figure 1:
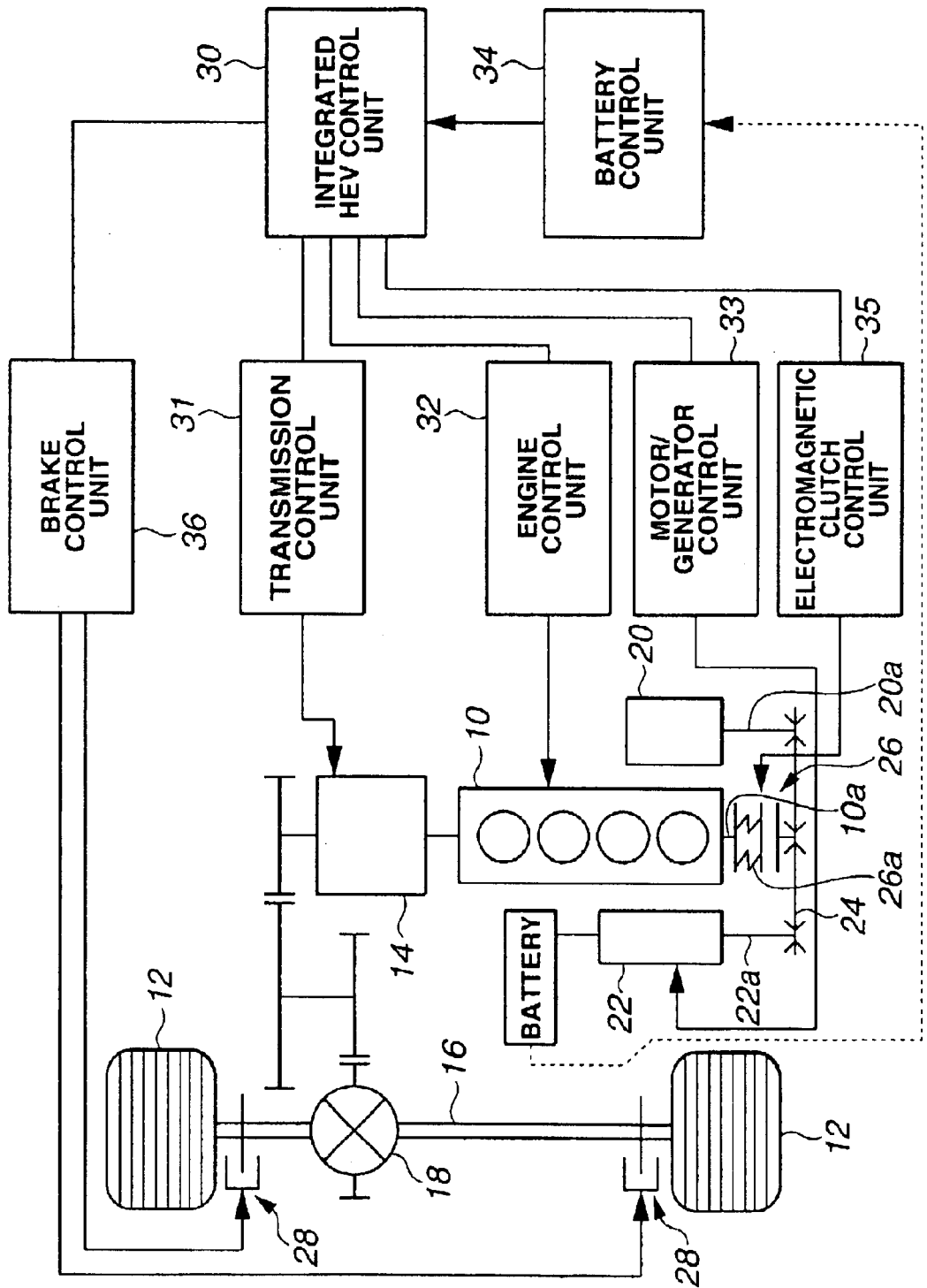
FIG. 1 is a system block diagram illustrating an auxiliary machine drive system of an automatic engine stop-restart system equipped automotive vehicle (a so-called idle-stop vehicle) of a first embodiment made according to the invention.

Referring now to the drawings, particularly to FIG. 1, the auxiliary machine drive system of the automatic engine stop-restart system equipped automotive vehicle (idle-stop vehicle) of the first embodiment is exemplified in a hybrid electric vehicle (HEV). As shown in FIG. 1, an automatic transmission 14 is provided in a power-transmission path from an internal combustion engine 10 such as a gasoline engine or a diesel engine to a pair of drive roadwheels 12, 12, so as to automatically change a reduction ratio or a transmission gear ratio, that is, a ratio of output speed to input speed and a ratio of output torque to input torque. Automatic transmission 14 may be comprised of a planetary-gear systems equipped automatic transmission whose number of speeds is limited or finite. Alternatively, automatic transmission 14 may be comprised of a continuously variable transmission (CVT), such as a belt-drive continuously variable transmission or a toroidal continuously variable transmission. Inner end portions of axle driveshafts 16 of drive wheels 12, 12 are connected to a differential 18. As is generally known, differential 18 is located between the drive-wheel axles to permit one drive wheel to turn at a different speed than the other while transmitting power (torque) from the propeller shaft to the drive-wheel axles. Differential 18 is connected through the propeller shaft to automatic transmission 14. A plurality of car accessories or auxiliary machines 20 and an auxiliary machine drive motor 22 are located around the engine. In explaining the first embodiment, for the purpose of simplification of the disclosure, only one auxiliary machine 20 is shown. Actually, a plurality of auxiliary machines 20, containing a water pump of an engine's cooling system, an air-conditioner compressor, a power-steering pump, and the like are provided around the engine. Auxiliary machine drive motor 22 is electrically connected to a car battery. In the shown embodiment, an electric motor/generator is used as the auxiliary machine drive motor 22. The motor/generator enables both a power running mode and a regenerative running mode. In lieu thereof, an electric motor may be used as the auxiliary machine drive motor. In this case, the electric motor enables only the power running mode. Auxiliary machine 20, auxiliary machine drive motor 22, and an engine crankshaft 10a of engine 10 are mechanically linked to each other by way of a wrapping connector including at least one power-transmission belt 24. In the auxiliary machine drive system of the first embodiment shown in FIG. 1, auxiliary machine 20 is connected to auxiliary machine drive motor 22 by means of power-transmission belt 24, without using any clutch. On the other hand, an electromagnetic clutch 26 is provided in a power-transmission path between engine 10 and each of auxiliary machine 20 and auxiliary machine drive motor 22, to connect and disconnect engine crankshaft 10a to and from each of auxiliary machine 20 and auxiliary machine drive motor 22. In the system of the first embodiment, electromagnetic clutch 26 is attached onto a rotational shaft of engine 10, that is, engine crankshaft 10a, and one power-transmission belt 24 is wound on the pulley fixedly connected to one end of engine crankshaft 10a, the pulley fixedly connected to one end of a rotational shaft 20a of auxiliary machine 20, and the pulley fixedly connected to one end of a rotational shaft 22a of auxiliary machine drive motor 22. Electromagnetic clutch 26 itself is comprised of a conventional electronically-controlled, hydraulically-operated multiple disk clutch. In the system of the first embodiment, note that electromagnetic clutch 26 functions as a normally-engaged type clutch. Hitherto, a normally-disengaged type clutch is used as an electromagnetic clutch that serves to connect and disconnect the engine crankshaft to and from the auxiliary-machine drive system. In case of the auxiliary-machine drive system disclosed in JP2001-193516 that uses the normally-disengaged type electromagnetic clutch, there are the following demerits. If the electromagnetic clutch cannot be energized owing to the signal-line breakage, signal-line burnout, fuse's blown or fusible link's blown even in the presence of an electromagnetic-clutch engaging requirement, the engine crankshaft remains disconnected from the auxiliary machines and therefore the auxiliary machines cannot be driven by means of the engine. As discussed previously, the auxiliary machines usually include a water pump of an engine's cooling system that forcibly re-circulates engine coolant and thus removes heat by the forced circulation of coolant and thereby avoids engine overheating, an air-conditioner compressor, and a power-steering pump that multiplies the driver's steering effort as an aid in turning the steering wheel. Assuming that the water pump does not operate normally, there is a possibility of undesired engine overheating. Assuming that the power-steering pump does not operate normally, a great driver's steering effort may be required. To avoid this, in the presence of the normally-disengaged type electromagnetic clutch failure, as a fail-safe function the auxiliary machines are generally driven by means of the auxiliary machine drive motor. Supposing that the auxiliary machines are driven by means of only the auxiliary machine drive motor for a long time period, a state of charge (SOC) of the car battery tends to drop or deteriorate, and whereby a normal vehicle running state cannot be maintained. In contrast to the above, in the system of the first embodiment, the normally-engaged type clutch is used as electromagnetic clutch 26. That is, when de-energized, electromagnetic clutch 26 becomes engaged. Conversely when energized, electromagnetic clutch 26 becomes disengaged. More concretely, in an initial state of electromagnetic clutch 26 that the electromagnetic clutch is de-energized, a return spring 26a forces electromagnetic clutch 26 to remain engaged. A brake 28 such as a disc brake is installed on each road wheel. Each of four brakes 28 has a wheel-brake cylinder to produce a braking force corresponding to a brake-fluid pressure applied to the wheel-brake cylinder. The higher the brake-fluid pressure applied, the greater the braking force.

As clearly shown in FIG. 1, a control system of the automatic engine stop-restart system equipped automotive vehicle of the first embodiment is comprised of an integrated electronic hybrid electric vehicle (HEV) control unit 30, a transmission control unit 31, an engine control unit 32, a motor/generator control unit 33, a battery control unit 34, and an electromagnetic clutch control unit 35, and a brake control unit 36. Each of control units 31 to 36 is electrically connected to integrated HEV control unit 30 via signal lines. Each of control units 30 to 36 generally comprises a microcomputer that includes a central processing unit (CPU) or a microprocessor (MPU), memories (RAM, ROM), and an input/output interface (I/O). The input/output interface (I/O) receives input information from various engine/vehicle switches and sensors, such as a vehicle speed sensor, a brake-pedal depression amount sensor or a brake switch, a-SOC (state of charge) sensor, an inhibitor switch, a transmission input speed sensor, a transmission output speed sensor, wheel-speed sensors, an ignition switch, a movable load sensor and the like. Within the control units, the central processing units (CPUs) allow the access by the I/O interface of input informational data signals from the engine/vehicle switches and sensors, and are responsible for carrying various control programs stored in the memories and capable of performing necessary arithmetic and logic operations. Computational results or arithmetic calculation results, in other words, calculated output signals or control signals are relayed via the output interface circuitries of the control units to output stages, for example, the shift valves of the automatic transmission, fuel injectors, spark plugs, motor/generator 22, electromagnetic clutch 26, a hydraulic-modulator magnetically-controlled solenoid valves that serve to regulate each wheel-cylinder pressure. Concretely, the speed-change control for automatic transmission 14 is executed in response to a control signal from transmission control unit 31. The amount of fuel injected from each individual injector and ignition timing of each spark plug are controlled in response to control signals from engine control unit 32. Switching between the power running mode and the regenerative running mode of motor/generator 22 is controlled in response to a control signal from motor/generator control unit 33. Battery control unit 34 serves to output various battery informational data, such as a state of charge (SOC), the battery output voltage or current, to integrated HEV control unit 30. Electromagnetic clutch control unit 35 is responsive to a control signal from integrated HEV control unit 30 for executing ON/OFF control (energization/deenergization control) for electromagnetic clutch 26. Brake control unit 36 operates to control or regulate the brake-fluid pressure in each wheel-brake cylinder, responsively to all of the brake-pedal depression amount, the movable load of the vehicle (reflecting the number of vehicle occupants), and a slip ratio of each roadwheel that is usually estimated based on the vehicle speed and each wheel speed. An anti-skid braking system (ABS) may be included in brake control unit 36. Each of control units 30 to 36 comes into operation when inserting the ignition switch into the ignition key cylinder and turning it ON, and then starting a cold engine, that is, during the first engine start-up period. The control action of each of control units 30 to 36 is continuously executed until the ignition switch is turned OFF and pulled from the ignition key cylinder and thus the engine is stopped. In other words, control units 30 to 36 continue their control actions during an engine automatically-stopped state (described later) in which engine 10 is automatically stopped when the HEV is in its stopped state for exhaust-emission reducing purposes.

Figure 2:
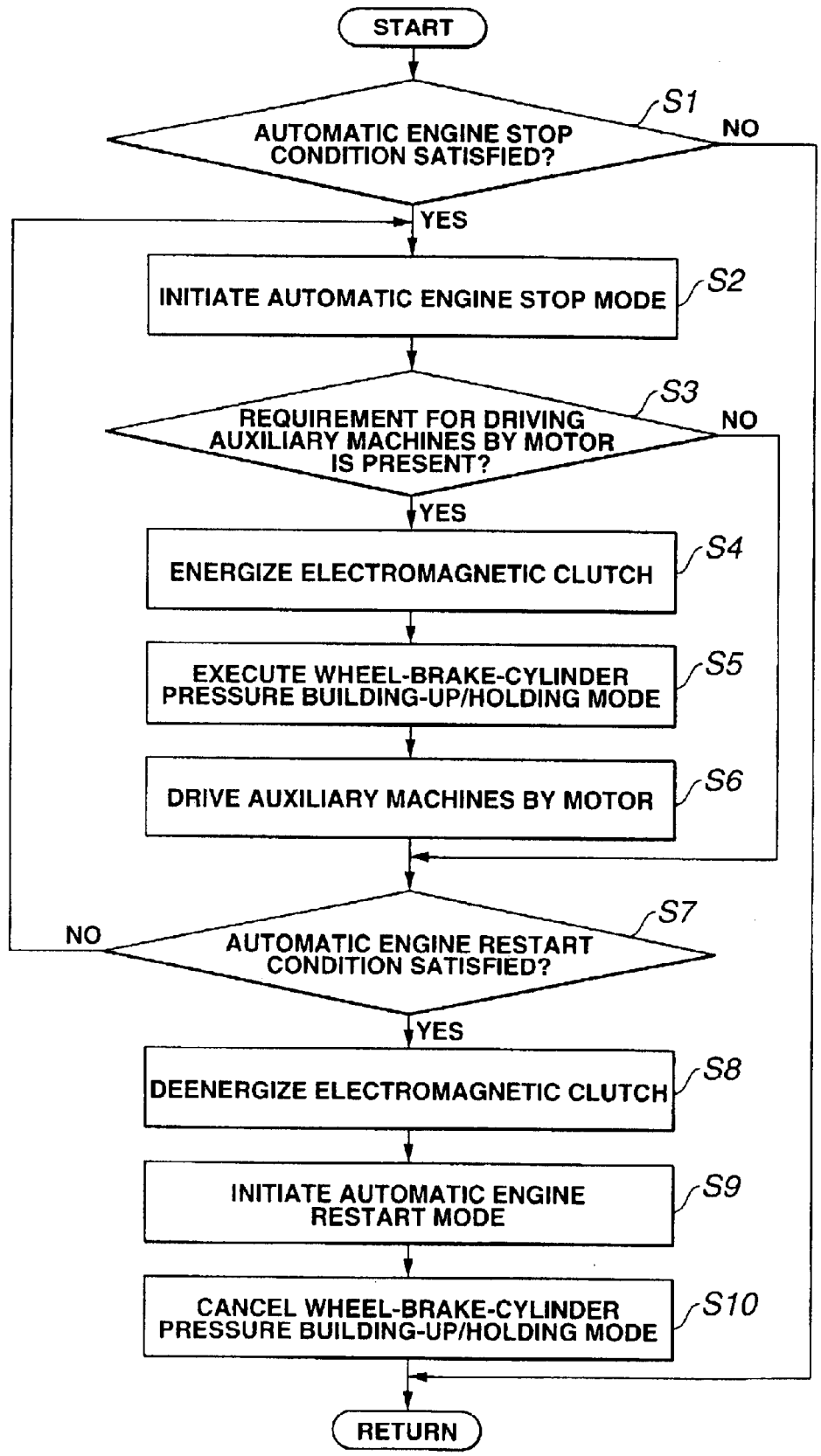
FIG. 2 is a flow chart illustrating an automatic engine stop-restart control routine executed by a control system incorporated in the automatic engine stop-restart system equipped automotive vehicle of the embodiment.

Referring now to FIG. 2, there is shown the automatic engine stop-restart control routine executed by the control system of the automatic engine stop-restart system equipped automotive vehicle of the first embodiment. Within integrated HEV control unit 30, the control routine shown in FIG. 2 is executed as time-triggered interrupt routines to be triggered every predetermined time intervals such as 10 msec.

At step S1, a check is made to determine whether a specified automatic stop condition of engine 10 (i.e., specified engine/vehicle operating conditions) is satisfied. At least a zero vehicle speed, a depressed brake pedal, and a state of charge (SOC) of the battery greater than or equal to a predetermined reference value are included in the specified automatic engine stop condition. When the answer to step S1 is in the affirmative (YES), that is, the specified automatic engine stop condition is satisfied, the routine proceeds from step S1 to step S2.

At step S2, engine 10 is automatically stopped by terminating fuel injection for each individual engine cylinder. Thereafter, step S3 occurs.

At step S3, a check is made to determine whether there is a requirement for driving auxiliary machines 20 by means of auxiliary machine drive motor 22. For example, during an operative state of the air conditioner, the integrated HEV control unit determines that the requirement for driving auxiliary machines 20 by means of auxiliary machine drive motor 22 is present. In this case, the answer to step S3 is affirmative (YES) and thus the routine proceeds from step S3 to step S4. Conversely when the answer to step S3 is negative (NO), the routine jumps from step S3 to step S7 (described later).

At step S4, electromagnetic clutch 26 is energized, and as a result the electromagnetic clutch becomes disengaged. Subsequently to step S4, step S5 occurs.

At step S5, the brake-fluid pressure in each individual wheel-brake cylinder is pressurized and built up above a predetermined pressure value P and held at a pressure level greater than or equal to predetermined pressure value P. After the flow from step S4 to step S5, that is, after execution of the wheel-brake-cylinder pressure building-up/holding mode, step S6 occurs.

At step S6, auxiliary machine drive motor 22 is operated at the power running mode responsively to a control command from motor/generator control unit 33, and as a result (that is, with electromagnetic clutch 26 disengaged and auxiliary machine drive motor 22 operating at the power running mode), auxiliary machines 20 are driven by means of the auxiliary machine drive motor. Thereafter, step S7 occurs.

At step S7, a check is made to determine whether a specified automatic restart condition of engine 10 is satisfied. At least an undepressed brake pedal, and the state of charge (SOC) below the predetermined reference value are included in the specified automatic engine restart condition. When the answer to step S7 is in the affirmative (YES), that is, the specified automatic engine restart condition is satisfied, the routine proceeds from step S7 to step S8. Conversely when the answer to step S7 is in the negative (NO), that is, the specified automatic engine restart condition is unsatisfied, the routine returns from step S7 to step S2.

At step S8, switching from the energized mode of electromagnetic clutch 26 to the deenergized mode is made, and as a result the electromagnetic clutch becomes engaged by virtue of the spring load of return spring 26a. In contrast to the above, when the answer to step S3 is in the negative (NO), the integrated HEV control unit determines that the requirement for driving auxiliary machines 20 by means of auxiliary machine drive motor 22 is absent. In the absence of the requirement for driving auxiliary machines 20 by means of auxiliary machine drive motor 22, electromagnetic clutch 26 remains de-energized and engaged, and thus the procedure of step S8 cannot be executed substantially. That is, only when the answer to step S3 (executed just before step S8) is affirmative, switching from the energized mode (i.e., the disengaged state) of electromagnetic clutch 26 to the deenergized mode (i.e., the engaged state) occurs. Just after electromagnetic clutch 26 has been conditioned in its engaged state through step S8, step S9 occurs.

At step S9, engine 10 is automatically restarted. Concretely when automatically restarting engine 10, crankshaft 10a is driven by means of auxiliary machine drive motor 22 that is operating at the power running mode, so as to initiate engine cranking. At the same time, fuel injection for each individual engine cylinder is initiated again. That is to say, auxiliary machine drive motor 22 that subsidiarily drives auxiliary machines 20, also serves as an engine start-up motor that restarts engine 10 during the automatic engine restart mode. If the answer to step S3 (executed just before step S9) is in the affirmative (YES), the integrated HEV control unit determines that the requirement for driving auxiliary machines 20 by means of auxiliary machine drive motor 22 is present and therefore auxiliary machine drive motor 22 is operating in the power running mode according to the procedure of step S6. In such a case, there is no need to purposely switch auxiliary machine drive motor 22 to the power running mode at step S9. As discussed above, through steps S8 and S9 (that is, with electromagnetic clutch 26 engaged and auxiliary machine drive motor 22 operating at the power running mode), engine 10 is cranked by means of auxiliary machine drive motor 22 for automatically restarting engine 10. Thereafter, as soon as integrated HEV control unit 30 determines the automatic engine restarting operation has been completed by a complete-explosion decision of engine 10, the routine advances from step S9 to step S10.

At step S10, the wheel-cylinder pressure building-up/holding mode set through step S5 is cancelled. As will be appreciated from the above, according to the system of the first embodiment, in the initial state (or the de-energized state or spring-loaded position) of electromagnetic clutch 26, electromagnetic clutch 26 is kept engaged by way of the spring load of return spring 26a. Even in presence of a failure of electromagnetic clutch 26, which may occur due to the signal-line breakage, signal-line burnout, fuse's blown or fusible link's blown, the electromagnetic clutch remains engaged. Thus, even in presence of an electromagnetic clutch failure, caused by the signal-line breakage, signal-line burnout, fuse's blown or fusible link's blown, the crankshaft of engine 10 remains connected to auxiliary machines 20 via power-transmission belt 24 with the electromagnetic clutch engaged. Hitherto, a normally-disengaged type electromagnetic clutch was used and thus auxiliary machines had to be driven by only the auxiliary machine drive motor, in the presence of the electromagnetic clutch failure. On the other hand, in the system of the first embodiment employing the normally-engaged type electromagnetic clutch, auxiliary machines 20 can be driven by the engine, even in the presence of the electromagnetic clutch failure. This prevents an excessive drop or deterioration in the state of charge (SOC) of the battery, thereby enabling and maintaining a stable vehicle running state. Additionally, during the automatic engine stop mode (that is, when the specified automatic engine stop condition of step S1 is satisfied), and in the presence of the requirement for driving auxiliary machines 20 by means of auxiliary machine drive motor 22 (that is, when the necessary condition of step S3 is satisfied), in other words, only when a predetermined energizing condition of electromagnetic clutch 26 is satisfied, step S4 takes place so as to energize the electromagnetic clutch. That is to say, during the most engine operating condition containing the engine running period, electromagnetic clutch 26 is kept deenergized. As appreciated, in case of the system of the first embodiment that electromagnetic clutch 26 is deenergized during the engine running state, an energizing time for electromagnetic clutch 26 can be remarkably shortened in comparison with the conventional system that the electromagnetic clutch is energized during the engine running state. Shortening the energizing time contributes to a reduction in electric power consumption, thus improving fuel economy.

On the other hand, during the automatic engine stop mode (that is, when the specified automatic engine stop condition of step S1 is satisfied), but in the absence of the requirement for driving auxiliary machines 20 by means of auxiliary machine drive motor 22 (that is, when the necessary condition of step S3 is unsatisfied), the routine of FIG. 2 jumps from step S3 to step S7 without the procedure of step S4. In this case, electromagnetic clutch 26 is not energized, and as a result the electromagnetic clutch is kept in its engaged state. This reduces electric power consumption. Also, when quickly restarting the engine from the automatic engine stop state, by virtue of the flow from step S3 via step S7 to step S8 it is possible to shorten a time duration required to engage the electromagnetic clutch. This ensures a quick automatic engine restart.

In addition to the above, only when the aforementioned predetermined energizing condition of electromagnetic clutch 26 is satisfied, that is, when the necessary conditions of steps S1 and S3 are both satisfied, electromagnetic clutch 26 becomes energized and thus disengaged. Therefore, even when auxiliary machines 20 have to be driven by means of auxiliary machine drive motor 22, there is no risk that a driving force produced by auxiliary machine drive motor 22 is transmitted to engine crankshaft 10a. This contributes to a reduction in the load on auxiliary machine drive motor 22.

When the predetermined energizing condition of electromagnetic clutch 26 is satisfied, that is, when the necessary conditions of steps S1 and S3 are both satisfied, however, electromagnetic clutch 26 cannot be energized due to some reasons such as the signal-line breakage, signal-line burnout, fuse's blown or fusible link's blown, the electromagnetic clutch remains engaged. In such a case, the driving force produced by auxiliary machine drive motor 22 may be undesirably transmitted to the engine crankshaft. As a result of this, the vehicle occupants may experience uncomfortable longitudinal acceleration feeling. To avoid this, when the predetermined energizing condition of electromagnetic clutch 26 is satisfied, that is, when the necessary conditions of steps S1 and S3 are both satisfied, prior to driving auxiliary machines 20 by auxiliary machine drive motor 22 (see step S6 of FIG. 2), the wheel-brake-cylinder pressure (corresponding to a braking force created by brake 28) is built up and held above predetermined value P (see step S5 of FIG. 2), capable of stably reliably maintaining the vehicle at the stopped state even when the electromagnetic clutch remains engaged owing to the electromagnetic clutch failure caused by the signal-line breakage, signal-line burnout, fuse's blown or fusible link's blown. Therefore, even when the predetermined energizing condition of electromagnetic clutch 26 is satisfied but exciting-current supply to electromagnetic clutch 26 is stopped accidentally and thus electromagnetic clutch 26 is unintentionally switched from the disengaged state to the engaged state, it is possible to avoid the vehicle occupants from experiencing uncomfortable longitudinal acceleration feeling by virtue of the increased wheel-brake-cylinder pressure built up above predetermined pressure value P.

Referring now to FIG. 3, there is shown the auxiliary machine drive system of the automatic engine stop-restart system equipped automotive vehicle (idle-stop vehicle) of the second embodiment. In explaining the second embodiment, for the purpose of simplification of the disclosure, the same reference signs used to designate elements in the first embodiment will be applied-to the corresponding elements used in the second embodiment, while detailed description of the same reference signs will be omitted because the above description thereon seems to be self-explanatory. As can be appreciated from comparison between the auxiliary machine drive systems shown in FIGS. 1 and 3, the layout of the power-transmission belt and electromagnetic clutch of the system of the second embodiment of FIG. 3 is somewhat different from that of the system of first embodiment of FIG. 1. Concretely, in the system of the second embodiment shown in FIG. 3, a first power-transmission belt 41 is wound on the rotational shaft 22a of auxiliary machine drive motor 22 and rotational shaft 20a of auxiliary machine 20, whereas a second power-transmission belt 42 is wound on the engine crankshaft 10a and rotational shaft 22a of auxiliary machine drive motor 22. On the other hand, electromagnetic clutch 26 is attached to rotational shaft 22a of auxiliary machine drivemotor 22. In the same manner as the system of the first embodiment, in the system of the second embodiment auxiliary machine 20 and auxiliary machine drive motor 22 are directly connected to each other by means of first power-transmission belt 41, without using any clutch. Also, the normally-engaged type electromagnetic clutch 26 is provided in a power-transmission path between engine 10 and each of auxiliary machine 20 and auxiliary machine drive motor 22, to connect and disconnect engine crankshaft 10a to and from each of auxiliary machine drive motor 22 and auxiliary machine 20. Therefore, the system of the second embodiment shown in FIG. 3 can provide the same effects as the system of the first embodiment shown in FIG. 1.

The entire contents of Japanese Patent Application No. P2002-71225 (filed Mar. 15, 2002) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An auxiliary machine drive system of an automatic engine stop-restart system equipped automotive vehicle capable of automatically stopping or restarting an engine depending on vehicle operating conditions, comprising:
   an electromagnetic clutch disposed between the engine and at least one auxiliary machine for connecting and disconnecting a crankshaft of the engine to and from the auxiliary machine;
   an electromagnetic clutch control unit deenergizing the electromagnetic clutch at least when the engine is running, and energizing the electromagnetic clutch only when a predetermined energizing condition is satisfied, the predetermined energizing condition including at least a stopped state of the engine; and
   the electromagnetic clutch comprising a normally-engaged electromagnetic clutch that is engaged when deenergized, and disengaged when energized.

2. The auxiliary machine drive system as claimed in claim 1, further comprising:
   an electric motor connected to the auxiliary machine to drive the auxiliary machine; and
   the electric motor serving as an engine start-up motor that is connected to the crankshaft of the engine via the electromagnetic clutch when automatically restarting the engine.

3. The auxiliary machine drive system as claimed in claim 1, wherein:
   the predetermined energizing condition includes a condition that a requirement for driving the auxiliary machine by means of the electric motor is present.

4. The auxiliary machine drive system as claimed in claim 2, further comprising:
   a brake control unit executing a wheel-brake-cylinder pressure building-up and holding mode in which a braking force of the vehicle is built up above and held at a predetermined value, when energizing and disengaging the electromagnetic clutch.

5. An auxiliary machine drive system of an automatic engine stop-restart system equipped automotive vehicle capable of automatically stopping or restarting an engine depending on vehicle operating conditions, comprising:
   a motor generator connected to at least one auxiliary machine to drive the auxiliary machine;
   the motor generator serving as an engine start-up motor that is connected to a crankshaft of the engine via the electromagnetic clutch when automatically restarting the engine;

an electromagnetic clutch disposed between the engine and each of the auxiliary machine and the motor generator for connecting and disconnecting the crankshaft of the engine to and from each of the auxiliary machine and the motor generator;

a wrapping connector by which the auxiliary machine and the motor generator are directly connected to each other;

an electromagnetic clutch control unit deenergizing the electromagnetic clutch at least when the engine is running, and energizing the electromagnetic clutch only when a predetermined energizing condition is satisfied, the predetermined energizing condition including at least a stopped state of the engine; and the electromagnetic clutch comprising a normally-engaged electromagnetic clutch that is engaged when deenergized, and disengaged when energized.

6. The auxiliary machine drive system as claimed in claim 5, wherein:

the electromagnetic clutch is attached to the crankshaft of the engine; and the wrapping connector comprises a power-transmission belt wound on an axial end of the crankshaft, an axial end of a rotational shaft of the auxiliary machine, and an axial end of a rotational shaft of the motor generator.

7. The auxiliary machine drive system as claimed in claim 5, wherein:

the electromagnetic clutch is attached to a rotational shaft of the motor generator; and the wrapping connector comprises a first power-transmission belt wound on an axial end of the rotational shaft of the motor generator and an axial end of a rotational shaft of the auxiliary machine, and a second power-transmission belt wound on an axial end of the crankshaft and the axial end of the rotational shaft of the motor generator.

8. An auxiliary machine drive system of an automatic engine stop-restart system equipped automotive vehicle capable of automatically stopping or restarting an engine depending on vehicle operating conditions, comprising:

an electromagnetic clutch disposed between the engine and at least one auxiliary machine for connecting and disconnecting a crankshaft of the engine to and from the auxiliary machine;

a control means for deenergizing the electromagnetic clutch at least when the engine is running, and for energizing the electromagnetic clutch only when a predetermined energizing condition is satisfied, the predetermined energizing condition including at least a stopped state of the engine; and the electromagnetic clutch comprising a normally-engaged electromagnetic clutch that is engaged when deenergized, and disengaged when energized.

9. A method for executing automatic engine stop-restart control functions for an auxiliary machine drive system of an automatic engine stop-restart system equipped automotive vehicle capable of automatically stopping or restarting an engine depending on vehicle operating conditions and having an electromagnetic clutch disposed between the engine and at least one auxiliary machine for connecting and disconnecting a crankshaft of the engine to and from the auxiliary machine and a motor generator connected to the auxiliary machine to drive the auxiliary machine, the method comprising:

determining whether a specified automatic stop condition of the engine is satisfied;

automatically stopping the engine when the specified automatic stop condition of the engine is satisfied;

determining whether a requirement for driving the auxiliary machine by means of the motor generator is present;

energizing and disengaging the electromagnetic clutch when the specified automatic stop condition of the engine is satisfied and the requirement for driving the auxiliary machine by means of the motor generator is present;

driving the auxiliary machine by means of the motor generator when the electromagnetic clutch is energized and disengaged when the specified automatic stop condition of the engine is satisfied and the requirement for driving the auxiliary machine by means of the motor generator is present;

determining whether a specified automatic restart condition of the engine is satisfied;

deenergizing and engaging the electromagnetic clutch when the specified automatic restart condition of the engine is satisfied; and automatically restarting the engine by driving the crankshaft by means of the motor generator and by cranking the engine when the specified automatic restart condition of the engine is satisfied.

10. The method as claimed in claim 9, further comprising:

executing a wheel-brake-cylinder pressure building-up and holding mode in which a braking force of the vehicle is built up above and held at a predetermined value, when energizing and disengaging the electromagnetic clutch; and canceling the wheel-brake-cylinder pressure building-up and holding mode after the engine has been automatically restarted.

\* \* \* \* \*